United States Patent [19]

Okada

[11] 4,115,821
[45] Sep. 19, 1978

[54] NONRECORDED SECTION DETECTION IN A TAPE RECORDER APPARATUS

[75] Inventor: Yoshimasa Okada, Higashihiroshima, Japan

[73] Assignee: Sharp Kabushiki Kaisha, Osaka, Japan

[21] Appl. No.: 734,460

[22] Filed: Oct. 21, 1976

[30] Foreign Application Priority Data

Oct. 21, 1975 [JP] Japan .................. 50-127003

[51] Int. Cl.² ............... G11B 15/18; G11B 15/48
[52] U.S. Cl. ............................. 360/72; 360/74
[58] Field of Search ............... 360/72, 73, 69, 74; 235/61.11 E, 61.11 D, 61.11 R, 449, 475, 476; 340/146.3 D; 274/11 R

[56] References Cited

U.S. PATENT DOCUMENTS

| | | | |
|---|---|---|---|
| 3,501,623 | 3/1970 | Robinson | 340/146.3 D |
| 3,723,666 | 3/1973 | Ferrari | 360/72 |
| 3,893,177 | 7/1975 | Takenaka | 360/72 |
| 3,918,090 | 11/1975 | Ludwig | 360/72 |
| 3,984,869 | 10/1976 | Fujii | 360/73 |
| 4,014,039 | 3/1977 | Yasunaga | 360/74 |
| 4,054,930 | 10/1977 | Terada | 360/74 |

*Primary Examiner*—Robert M. Kilgore
*Attorney, Agent, or Firm*—Birch, Stewart, Kolasch & Birch

[57] ABSTRACT

In a nonrecorded section detection system of a tape recorder apparatus comprising a differentiation circuit including a capacitor connected to an output transistor of a nonrecorded section detection signal generator and a resistor interposed between a DC power source and said capacitor, and a driving means for activating a plunger in order to release the nonrecorded section detection mode in response to a differentiated output signal of said differentiation circuit, a switching transistor is interposed between the differentiation circuit and the driving means. The switching transistor is connected to receive a driving voltage from said DC power source through a switching means which is placed in its ON condition when the tape recorder apparatus is in the nonrecorded section detection mode.

7 Claims, 3 Drawing Figures

NONRECORDED SECTION DETECTION IN A TAPE RECORDER APPARATUS

BACKGROUND OF THE INVENTION

The present invention relates to a nonrecorded section detection system in a tape recorder apparatus.

The nonrecorded section detection system is very useful because it can select a desired program within plural programs recorded on a magnetic tape in a tape recorder apparatus. The nonrecorded section detection system usually functions to feed the magnetic tape at a fast speed upon depression of a nonrecorded section detection switch and stop the tape feed or feed the magnetic tape at a normal playback speed upon detection of a nonrecorded section provided before the desired program. Thereafter the tape recorder apparatus is automatically placed in its normal playback mode or manually placed in its normal playback mode through the use of a playback button, thereby reproducing the desired program in the normal playback mode.

The nonrecorded section detection system usually comprises a nonrecorded section detection head, a nonrecorded section detection circuit and a tape drive control mechanism including a driving transistor controlled by a nonrecorded section detection signal derived from the nonrecorded section detection circuit. The conventional nonrecorded section detection system further comprises a differentiation circuit including a capacitor connected to receive the nonrecorded section detection signal derived from the nonrecorded section detection circuit and a resistor interposed between a DC power source and said capacitor. The driving transistor of the tape drive control mechanism is controlled by a differentiated output signal of the differentiation circuit, thereby activating a plunger for releasing the nonrecorded section detection mode.

In the above-mentioned conventional nonrecorded section detection system, there is a possibility that the driving transistor is erroneously triggered into conduction when a power supply switch is closed or opened. This will activate the plunger and, hence, the tape feed mechanism is shifted when it is not desired.

There have been proposed some approaches to prevent the above-mentioned erroneous operation occurring when the power switch is closed. However, the conventional approaches are not effective at all times.

OBJECTS AND SUMMARY OF THE INVENTION

Accordingly, an object of the present invention is to provide a nonrecorded section detection system for a tape recorder apparatus which ensures an accurate operation.

Another object of the present invention is to provide a nonrecorded section detection system for a tape recorder apparatus which can prevent the erroneous operation thereof when the power switch is closed.

Other objects and further scope of applicability of the present invention will become apparent from the detailed description given hereinafter. It should be understood, however that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a switching transistor is interposed between the differentiation circuit and the driving transistor of the tape drive control mechanism. The switching transistor is connected to receive a driving voltage from the DC power source through a switching means which is placed in its ON condition only when the tape recorder apparatus is in the nonrecorded section detection mode, thereby preventing the erroneous operation of the driving transistor at the closing or opening of the power switch.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Referring now in detail to the drawings, and to facilitate a more complete understanding of the present invention, an erroneous operation preventing means of the prior art will be first described with reference to FIGS. 2 and 3.

Figures 2, 3:
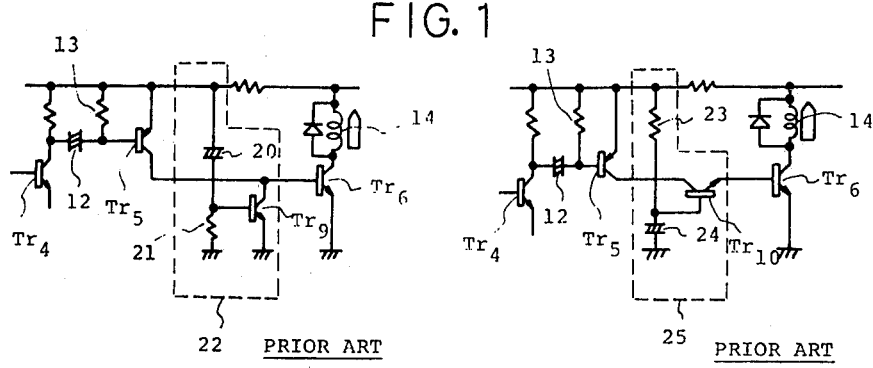
FIG. 2 is a circuit diagram of an example of erroneous operation preventing means of the prior art.
FIG. 3 is a circuit diagram of another example of an erroneous operation preventing means of the prior art.

To prevent the erroneous operation of a plunger in a tape drive control mechanism when a power switch is closed, a differentiation circuit 22 shown in FIG. 2 or an integration circuit 25 shown in FIG. 3 is interposed between a nonrecorded section detection circuit and a driving transistor $Tr_6$ of the tape drive control mechanism in the prior art. The differentiation circuit 22 comprises a capacitor 20 and a resistor 21, and the integration circuit 25 comprises a resistor 23 and a capacitor 24. Both circuits include the capacitor and, therefore, there is a possibility that the driving transistor $Tr_6$ will be erroneously triggered into conduction when a power switch is closed for a long time period and opened and then again closed after a short time period of open condition. This is because the capacitors 20 or 24 can not completely discharge the charge stored therein before the power switch is again closed.

More specifically, a capacitor 12 and the capacitors 20 and 24 do not store the charge when the power switch is in the open condition for a long time period. Under these conditions, when the power switch is closed, a transient current flows through a resistor 13, a capacitor 12 and a transistor $Tr_4$ in the nonrecorded section detection circuit, thereby turning on an output transistor $Tr_5$. A transistor $Tr_9$ is turned on by the differentiation circuit 22 consisting of the capacitor 20 and the resistor 21, whereas a transistor $Tr_{10}$ is maintained OFF by the integration circuit 25 made of the resistor 23 and the capacitor. Therefore, the driving transistor $Tr_6$ and, hence, a plunger 14 are maintained OFF even though the output transistor $Tr_5$ is on when the power switch is thrown.

Now assume the condition when the power switch is closed for a sufficiently long time period, and opened for a considerably short time period, and thereafter again closed. The transient current flows through the resistor 13 since the capacitor 12 can discharge the charge stored therein at once and, therefore, the output transistor $Tr_5$ is turned on. However, the differentiation circuit and the integration circuit can not function in their normal operation modes because the power switch is closed before the charge stored in the capacitors 20 and 24 is completely discharged. Thus, the transistor $Tr_9$ is maintained OFF and the transistor $Tr_{10}$ is maintained ON, respectively, and, therefore, the driving transistor $Tr_6$ becomes ON to enable the plunger 14.

The tape recorder apparatus is so constructed as to close the power switch when any one of the operation buttons is locked. Therefore, there is a possibility that the plunger will be erroneously enabled when the operation button is locked. It is very undesirable that the system functions as if the nonrecorded section detection signal is derived from the nonrecorded section detection circuit when any one of the operation buttons is locked.

The present invention solves the above-mentioned problems. More particularly, the present invention provides a nonrecorded section detection system for a tape recorder apparatus which can prevent the erroneous operation of the plunger when the power switch is closed.

Figure 1:
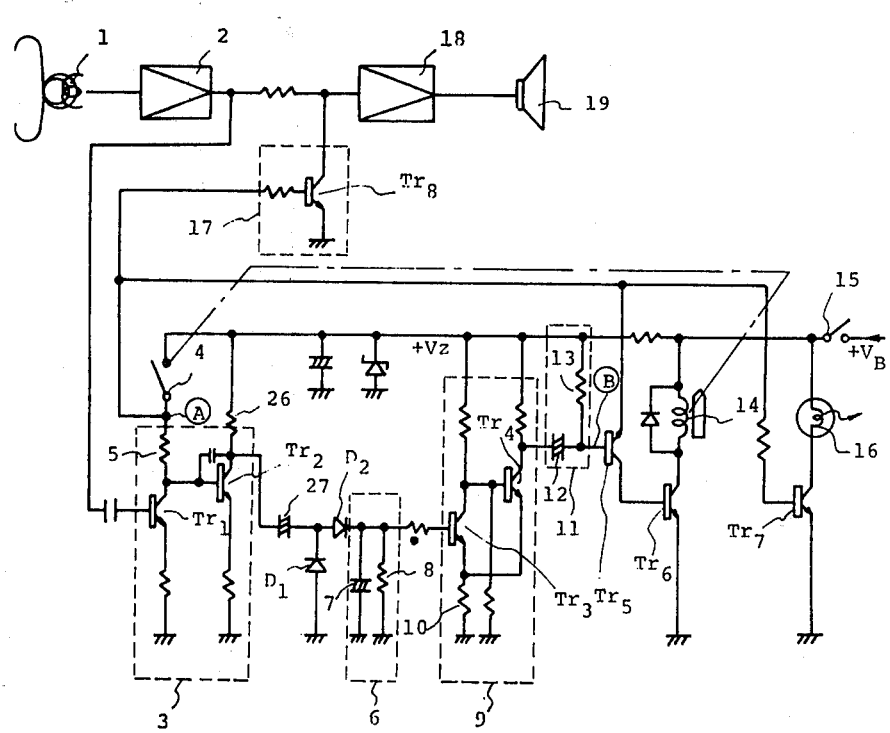
FIG. 1 is a circuit diagram of an embodiment of a nonrecorded section detection system of the present invention.

Referring now to FIG. 1, there is illustrated an embodiment of a nonrecorded section detection system of the present invention. The tape recorder apparatus is placed in the nonrecorded section detection mode when a fast forward button or a rewind button is locked under the normal playback mode, or, when a playback button is locked.

A nonrecorded section detection head 1 contacts with a magnetic tape when the fast forward button or the rewind button is locked under the normal playback mode. An equalizer/amplifier 2 and a limiter/amplifier 3 is connected to receive output signals from the nonrecorded section detection head 1. An auxiliary power supply switch 4 is ON only when both of the playback button and the fast forward button are locked, or both of the playback button and the rewind button are locked, namely, when the tape recorder apparatus is placed in the nonrecorded section detection mode. A rectifying circuit made of capacitors 27 and 7, diodes $D_1$ and $D_2$, and a resistor 8 is connected to receive output signals of the limiter/amplifier 3 and supplies the following Schmitt trigger circuit 9 with a rectified signal. A differentiation circuit 11 made of a capacitor 12 and a resistor 13 functions to differentiate output signals of the Schmitt trigger circuit 9 and drive the output transistor $Tr_5$ and the driving transistor $Tr_6$. It is an important feature of the present invention that the emitter electrode of the output transistor $Tr_5$ is connected to a main power supply line $+V_B$ via the auxiliary power supply switch 4.

When a main power supply switch 15 is OFF, the circuit of FIG. 1 is wholly OFF and, therefore, the capacitor 12 does not store the charge therein. The main power supply switch 15 is closed when any one of the operation buttons of the tape recorder apparatus is locked. Upon closing of the main power supply switch 15, the transient current flows through the resistor 13, the capacitor 12 and the transistor $Tr_4$. The transistor $Tr_4$ is maintained ON when a transistor $Tr_3$ is OFF, namely, when the nonrecorded section is not detected. However, the output transistor $Tr_5$ is maintained OFF because the auxiliary power supply switch 4 is open. Therefore, the driving transistor $Tr_6$ is not conducted and, hence, the plunger 14 is not enabled.

When the fast forward button or the rewind button is locked under the condition when the playback button is locked, that is, when the tape recorder apparatus is placed in the nonrecorded section detection mode, the auxiliary power supply switch 4 is closed. Before this moment, the capacitor 12 is sufficiently charged up and, therefore, the transient current does not flow. The output transistor $Tr_5$ is maintained OFF and, hence, the plunger 14 is not enabled. The plunger 14 functions to release the locked condition of the fast forward button or the rewind button when the nonrecorded section is detected when the tape recorder apparatus is in the nonrecorded section detection mode.

In the nonrecorded section detection mode, the auxiliary power supply switch 4 is closed, whereby the voltage level of a point Ⓐ appears at the base electrode of a transistor $Tr_7$ via a resistor. The transistor $Tr_7$ is ON to enable a lamp 16, thereby indicating the nonrecorded section detection mode. A muting circuit 17 includes a transistor $Tr_8$ which is ON when the auxiliary power supply switch 4 is closed, thereby preventing the discharge of loud sound from a speaker 19 via an amplifier 18 when the tape recorder apparatus is in the nonrecorded section detection mode.

When the tape recorder apparatus is not in the nonrecorded section detection mode, the auxiliary power supply switch 4 is open and, therefore, a transistor $Tr_1$ and a transistor $Tr_2$ are OFF in the normal playback mode because a collector resistor 5 is in the open condition and the transistor $Tr_2$ does not receive a bias voltage. A resistor 26 and the capacitors 27 and 7 are selected so that their constant values maintain the charged level of the capacitor 7 at around the ground potential when the transistors $Tr_1$ and $Tr_2$ are OFF. Therefore, a transistor $Tr_3$ is OFF and the transistor $Tr_4$ is ON, respectively, in the normal playback mode. Moreover, the emitter electrode of the output transistor $Tr_5$ is in the open condition in the normal playback mode. Therefore, one terminal of the resistor 5 can, alternatively, be connected directly to the main power supply line $+V_B$ without intervention of the auxiliary power supply switch 4. However, in this case, the transistors $Tr_3$ and $Tr_4$ repeat the switching operation in response to the provision and absence of the reproduction signal even in the normal playback mode. This will create noises.

The invention being thus described, it will be obvious that the same may be varied in many ways. Such variations are not to be regarded as a departure from the spirit and scope of the invention, and all such modifications are intended to be included within the scope of the following claims:

What is claimed is:

1. In a nonrecorded section detection system of a tape recorder apparatus comprising a nonrecorded section detection circuit, a main power switch for the tape recorder, and a driving means for activating a plunger in order to release a nonrecorded section detection mode in response to an output signal of the nonrecorded section detection circuit, the improvement comprising:
   a switching means interposed between the nonrecorded section detection circuit and the driving means;
   an auxiliary power supply switch connected to a power supply terminal through said main power switch, said auxiliary power supply switch being placed in its ON condition only when the tape recorder apparatus is in the nonrecorded section detection mode; and circuit means for applying a bias voltage from said power supply terminal to said switching means only via said auxiliary power supply switch.

2. The nonrecorded section detection system of claim 1, wherein the driving means comprises a driving transistor connected to receive an output signal of said switching means.

3. The nonrecorded section detection system of claim 1, wherein the nonrecorded section detection circuit comprises a differentiation circuit including a capacitor connected to receive a nonrecorded section detection signal and a resistor interposed between the power supply terminal and said capacitor, and wherein said switching means is connected to receive a differentiated output signal of said differentiation circuit.

4. A nonrecorded section detection system in a tape recorder apparatus comprising:

a nonrecorded section detection head;

an amplifier for amplifying an output signal of the nonrecorded section detection head;

a first switching means responsive to an output signal of the amplifier;

a charge/discharge circuit connected to receive its charge current through the first switching means;

a level detector for detecting the charge level of the charge/discharge circuit;

a differentiation circuit including a capacitor connected to receive an output signal of the level detector, and a resistor interposed between a DC power source and said capacitor;

a second switching means connected to receive a differentiated output signal of the differentiation circuit;

a main power supply switch for connecting said DC power source to said detection system;

an auxiliary power supply switch connected to the DC power source through said main power supply switch, said auxiliary power supply switch being ON when the tape recorder apparatus is in a nonrecorded section detection mode;

circuit means for applying a bias voltage from the DC power source to said second switching means only via said auxiliary power supply switch; and a driving means for activating a plunger in order to release the nonrecorded section detection mode in response to an output signal of said second switching means.

5. The nonrecorded section detection system of claim 4, wherein the second switching means comprises a transistor of which the base electrode is connected to receive the differentiated output signal of the differentiation circuit, the emitter electrode is connected to the auxiliary power supply switch, and the collector electrode is connected to the following driving means.

6. The nonrecorded section detection system of claim 4, wherein the first switching means is connected to receive its driving voltage from the DC power source via the auxiliary power supply switch.

7. The nonrecorded section detection system of claim 4, which further comprises an indication lamp for indicating the nonrecorded section detection mode when the tape recorder apparatus is in the nonrecorded section detection mode, and means for activating the indication lamp when the auxiliary power supply switch is closed.

* * * * *